United States Patent
Kunisawa

(10) Patent No.: US 8,418,736 B2
(45) Date of Patent: Apr. 16, 2013

(54) RUBBER COMPOSITION AND PNEUMATIC TIRE

(75) Inventor: Tetsuya Kunisawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 604 days.

(21) Appl. No.: 12/187,902

(22) Filed: Aug. 7, 2008

(65) Prior Publication Data

US 2009/0050250 A1     Feb. 26, 2009

(30) Foreign Application Priority Data

Aug. 24, 2007   (JP) ................................. 2007-218169

(51) Int. Cl.
*B60C 1/00* (2006.01)
*B60C 9/18* (2006.01)

(52) U.S. Cl.
USPC ............................ 152/526; 152/450; 152/537

(58) Field of Classification Search ................ 152/450, 152/526, 537
See application file for complete search history.

(56) References Cited

U.S. PATENT DOCUMENTS

| | | | | |
|---|---|---|---|---|
| 3,661,620 A | * | 5/1972 | Dekking et al. | 427/221 |
| 4,004,467 A | | 1/1977 | Kenney | |
| 4,295,509 A | * | 10/1981 | Stein | 152/158 |
| 4,911,218 A | * | 3/1990 | Patitsas | 152/525 |
| 5,073,444 A | * | 12/1991 | Shanelec | 428/313.5 |
| 5,591,279 A | * | 1/1997 | Midorikawa et al. | 152/209.4 |
| 6,330,897 B1 | * | 12/2001 | Nakamura et al. | 152/537 |
| 6,706,804 B2 | * | 3/2004 | Resendes | 524/552 |
| 8,110,056 B2 | * | 2/2012 | Kishimoto et al. | 156/128.1 |
| 2002/0014292 A1 | | 2/2002 | Minagoshi | |
| 2002/0120055 A1 | | 8/2002 | Scholl et al. | |
| 2005/0076994 A1 | | 4/2005 | Yoshida | |
| 2005/0192386 A1 | | 9/2005 | Miyazaki | |

FOREIGN PATENT DOCUMENTS

| | | |
|---|---|---|
| CN | 1615229 A | 3/2007 |
| CN | 1660948 A | 8/2007 |
| EP | 0 675 161 A1 | 10/1995 |
| JP | 60-141742 A | 7/1985 |
| JP | 6-228375 A | 8/1994 |
| JP | 7-258470 A | 10/1995 |

(Continued)

OTHER PUBLICATIONS

Machine translation of JP 2000-7838, Jan. 2000.*

(Continued)

*Primary Examiner* — Justin Fischer
(74) *Attorney, Agent, or Firm* — Birch, Stewart, Kolasch & Birch, LLP

(57) ABSTRACT

There are provided a rubber composition for coating a steel cord, containing 100 parts by mass of diene-based rubber; 0.5 to 5 parts by mass of a metal salt of an organic acid; and 30 to 100 parts by mass of a filler, wherein the filler contains 3 to 30 parts by mass of glass beads having a particle diameter of 10 to 100 μm, relative to 100 parts by mass of the diene-based rubber, and a tire reinforcement belt and a pneumatic tire using the rubber composition. The rubber composition reduces heat generation and improves adhesiveness with a steel cord. A pneumatic tire having a tire reinforcement belt using the rubber composition has excellent steering stability and rolling resistance.

2 Claims, 1 Drawing Sheet

FOREIGN PATENT DOCUMENTS

| | | | |
|---|---|---|---|
| JP | 2000-7838 | * | 1/2000 |
| JP | 2002-301902 A | | 10/2002 |
| JP | 2005-113015 A | | 4/2005 |
| JP | 2005-272815 A | | 10/2005 |
| WO | WO 2007/042229 | * | 4/2007 |

OTHER PUBLICATIONS

Hu et al., New Rubber Filler-Hollow Glass Bead. vol. 23, No. 6 Nov. 2002, pp. 14-17.

* cited by examiner

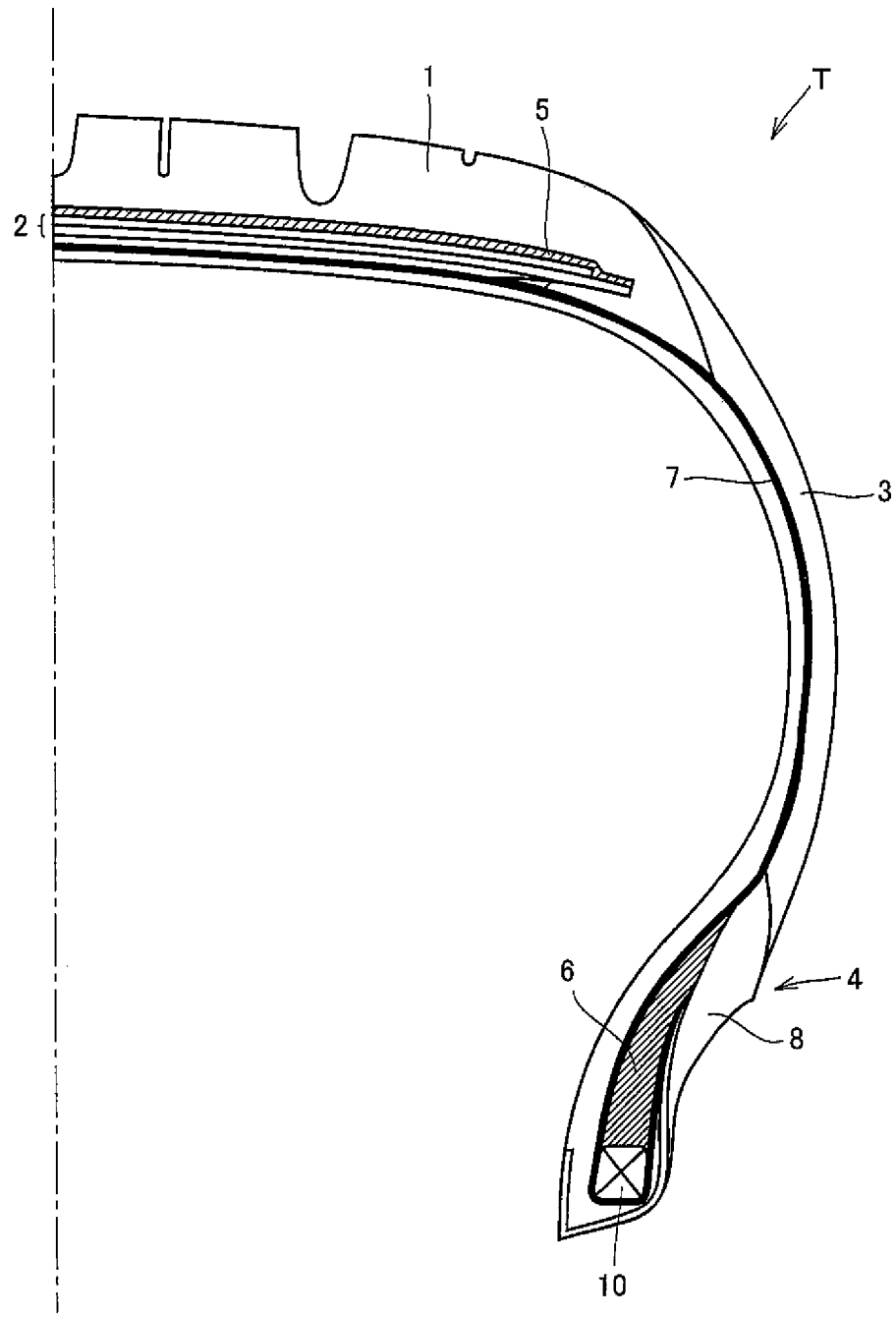

RUBBER COMPOSITION AND PNEUMATIC TIRE

This nonprovisional application is based on Japanese Patent Application No. 2007-218169 filed with the Japan Patent Office on Aug. 24, 2007, the entire contents of which are hereby incorporated by reference.

BACKGROUND OF THE INVENTION

1. Field of the Invention

The present invention relates to a rubber composition for coating a steel cord, a tire reinforcement belt in which the steel cord is coated with the rubber composition, and a pneumatic tire using the tire reinforcement belt.

2. Description of the Background Art

In a pneumatic tire, a tire reinforcement belt including a steel cord and rubber coating the steel cord is often used for the purpose of improving basic characteristics thereof. There are increasing demands on improvement of safety and steering stability of a pneumatic tire, and reduction of rolling resistance. An adhering interface between a steel cord and a rubber of a tire reinforcement belt is liable to be broken due to heat generation and repeated deformation during high-speed running, and such breakage will cause significant damage on the tire. Therefore, it is important to further improve adhesion strength between a steel cord and a rubber.

In general, a steel cord is plated with brass for the purpose of improving reinforcement effect of a belt by increasing adhesion strength with rubber. On the other hand, a rubber composition forming rubber that coats the steel cord sometimes contains a cobalt salt of an organic acid as an adhesion accelerator. When a large quantity of the cobalt salt of an organic acid is used, anti-deterioration adhesiveness is poor and adhesion strength decreases with time, although the adhesion strength directly after vulcanization, namely initial adhesiveness is excellent.

Also known is a technique that blends silica into a rubber composition forming the rubber for the purpose of increasing adhesion strength between rubber and a steel cord. Silica stabilizes the rubber composition by adsorbing moisture by a hydrophilic silanol group on the surface thereof. For example, silica is considered to control deterioration of an adhesion interface by adsorbing moisture present in the rubber composition or atmospheric moisture. However, when silica is blended, Mooney viscosity of the rubber composition increases, so that workability is impaired.

Japanese Patent Laying-Open No. 2005-113015 proposes a technique of containing a nano composite formed by micro-dispersing layered clay minerals in a rubber component, in a rubber composition for coating a steel cord, thereby improving fatigue resistance of the rubber composition, reducing heat generation, and improving initial adhesion and anti-deterioration adhesiveness of rubber with respect to the steel cord.

SUMMARY OF THE INVENTION

The present invention provides a rubber composition realizing reduced heat generation and improved adhesiveness with a steel cord, and a tire reinforcement belt using the rubber composition. An object of the present invention is to provide an pneumatic tire realizing reduced rolling resistance and improved steering stability by using the tire reinforcement belt.

The present invention provides a rubber composition for coating a steel cord, containing 100 parts by mass of diene-based rubber, 0.5 to 5 parts by mass of a metal salt of an organic acid, and 30 to 100 parts by mass of a filler, wherein the filler contains 3 to 30 parts by mass of glass beads having a particle diameter of 10 to 100 μm, relative to 100 parts by mass of the diene-based rubber. Preferably, the filler further contains 5 to 90 parts by mass of carbon black, relative to 100 parts by mass of the diene-based rubber.

The metal salt of an organic acid is preferably cobalt stearate or cobalt naphthenate.

The present invention also provides a tire reinforcement belt in which a plurality of steel cords drawn and aligned substantially in parallel are coated with the rubber composition for coating a steel cord. The present invention also provides an pneumatic tire having a belt layer formed by at least two tire reinforcement belts described above, disposed so that the plurality of steel cords cross each other in a tire circumferential direction.

In the present invention, since a specific amount of glass beads is blended as a part of the filler in the rubber composition for coating a steel cord, heat generation of a tire reinforcement belt in which a steel cord is coated with the rubber composition, and adhesiveness between the steel cord and the rubber are improved. As a result, in the pneumatic tire using the tire reinforcement belt, rolling resistance is reduced, and steering stability is improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a section view showing a right half of a pneumatic tire of the present invention.

DESCRIPTION OF THE PREFERRED EMBODIMENTS

<Rubber Composition For Coating Steel Cord>

A rubber composition for coating a steel cord of the present invention contains 100 parts by mass of diene-based rubber, 0.5 to 5 parts by mass of a metal salt of an organic acid, and 30 to 100 parts by mass of a filler, and the filler contains 3 to 30 parts by mass of glass beads having a particle diameter of 10 to 100 μm, relative to 100 parts by mass of the diene-based rubber.

(Diene-Based Rubber)

As the diene-based rubber used in the rubber composition of the present invention, natural rubber or synthetic rubber is used. Examples of the synthetic rubber include styrene-butadiene copolymer rubber (SBR), butadiene rubber, isoprene rubber, ethylene-propylene-diene rubber (EPDM), butyl rubber, halogenated butyl rubber, a copolymer of isobutylene and p-halogenated methyl styrene, acrylonitrile-butadiene copolymer rubber (NBR), and the like.

As the natural rubber, various kinds of natural rubber may be used. Modified natural rubber such as epoxidized natural rubber and deproteinized natural rubber may be used. A rubber component other than diene-based rubber may be blended insofar as the effect of the present invention is not prevented. Content of such a rubber component other than diene-based rubber is usually 20% by mass or less of the entire rubber component.

As the diene-based rubber in the present invention, one kind or two or more kinds may be appropriately selected from natural rubber and synthetic rubber depending on the required characteristic of the tire reinforcement belt. However, from the viewpoint of maintaining adhesion strength and rubber breakage strength, in particular, it is preferred that 50 parts by mass or more of natural rubber is contained in the rubber component.

(Filler)

In the rubber composition for coating a steel cord of the present invention, a filler such as carbon black, silica, clay, alumina, talc, mica, kaolin, clay, calcium carbonate magnesium carbonate, aluminum hydroxide, magnesium hydroxide, magnesium oxide, titanium oxide, calcium sulfate may be used solely or in combination of two or more kinds, together with the glass beads. Here, the filler is blended in an amount of 30 to 100 parts by mass, preferably 40 to 80 parts by mass, relative to 100 parts by mass of diene-based rubber. These fillers contribute to reduce heat generation, and to improve tensile strength, breaking strength, tensile stress, and hardness of vulcanized rubber composition.

As for the glass beads, from the viewpoint of improving the adhesion strength and reducing the heat generation, those having a particle diameter ranging from 10 to 100 μm, preferably 30 to 80 μm are preferred. The glass beads may be the ones whose surface is treated in advance, for example, with rubber component or polypropylene grafted with unsaturated carboxylic acid or its anhydride.

The glass beads are blended in an amount of 3 to 30 parts by mass, relative to 100 parts by mass of diene-based rubber. When the blending amount is less than 3 parts by mass, rolling resistance is not improved. On the other hand, when the amount is more than 30 parts by mass, steering stability is deteriorated, though the rolling resistance is improved. Best balance between rolling resistance and steering stability is achieved when 5 to 20 parts by mass of glass beads is blended relative to 100 parts by mass of diene-based rubber. In other words, by blending glass beads, stiffness of rubber that coats a steel cord in a tire reinforcement belt increases, so that steering stability is improved, and rolling resistance is reduced because movement of a belt layer formed of the tire reinforcement belt is suppressed. On the other hand, when the blending amount of glass beads is too large, the rubber that coats a steel cord is so hard that the flexibility of a tread part is lost.

Preferably, the rubber composition for coating a steel cord of the present invention contains carbon black as a part of the filler. As the carbon black, HAF, ISAF, SAF and so on having an average particle diameter of 30 nm or less are preferred. The blending amount of the carbon black is preferably in the range of 5 to 90 parts by mass, and more preferably in the range of 40 to 70 parts by mass, relative to 100 parts by mass. Carbon black improves tensile strength, breaking strength, tensile stress and hardness of a vulcanized rubber composition.

The rubber composition for coating a steel cord according to the present invention may contain silica as a part of the filler. As the silica, those having a silanol group on a particle surface are preferred. The silica may be produced by a dry process or a wet process (hydrous silicic acid) and hydrous silicic acid is preferred. Silica adsorbs moisture by hydrophilicity of a silanol group on the surface of a silica particle. Since this moisture effectively acts on the interface between the steel cord and the rubber that coats the same, addition of silica improves initial adhesiveness of the rubber for the steel cord. The BET specific surface area of silica is preferably 160 $m^2/g$ or less, and more preferably in the range of 40 to 140 $m^2/g$.

When silica is blended, the blending amount is preferably in the range of 5 to 40 parts by mass, relative to 100 parts by mass of diene-based rubber.

(Metal Salt of Organic Acid)

The rubber composition for coating a steel cord of the present invention may contain an adhesion accelerator such as a metal salt of an organic acid, in particular, a cobalt salt of an organic acid, for the purpose of improving adhesiveness between the steel cord and the rubber that coats the same. The organic acid forming the metal salt of an organic acid may be saturated or unsaturated, and may be straight-chained or branched-chained. Examples of a preferably used organic acid are stearic acid, oleic acid, naphthenic acid, linoleic acid, linolenic acid, neodecanoic acid, octylic acid, rhodine, and the like. Metal salts of an organic acid formed from these organic acids have excellent affinity with diene-based rubber, and have excellent adhesiveness with a steel cord. In the present invention, it is preferred to add a metal salt of an organic acid so that the metal salt of an organic acid is 0.5 to 5 parts by mass, relative to 100 parts by mass of diene-based rubber. When the content of the metal salt of an organic acid is 0.5 part by mass or more, initial adhesiveness between a steel cord and rubber that coats the same, and anti-deterioration adhesiveness are excellent. When the content is 5 parts by mass or less, there is little risk that water generation and heat deterioration occur due to reaction between the metal salt of an organic acid and a vulcanization accelerator or antioxidant in the rubber composition, so that anti-deterioration adhesiveness is satisfactorily ensured.

(Sulfur)

Preferably, the rubber composition for coating a steel cord of the present invention contains sulfur. The blending amount of sulfur is preferably in the range of 1 to 8 parts by mass, relative to 100 parts by mass of diene-based rubber. When the blending amount of sulfur is less than 1 part by mass, production of $Cu_xS$ produced by reaction between copper in brass plating on the surface of the steel cord and sulfur is insufficient, so that sufficient sulfur cannot be supplied. Therefore, bonding strength with diene-based rubber is insufficient, and adhesiveness is not improved. On the contrary, when the blending amount is more than 8 parts by mass, $Cu_xS$ produces excessively, and bloated $Cu_xS$ aggregates and breaks, leading deterioration in adhesiveness and tendency of decreasing heat aging resistance which is one of mechanical property of rubber.

(Other Blending Agents)

In the rubber composition for coating a steel cord of the present invention, blending agents that are generally used in rubber industries may be appropriately blended in usual blending amounts. For examples, as a softening agent, process oil, aroma oil and the like may be used. As a vulcanization accelerator, guanidines such as diphenyl guanidine, thiazoles such as mercapto benzothiazole, sulfenamides such as N,N'-dicyclohexyl-2-benzotiazolyl sulfenamide, and thiurams such as tetramethyl thiuram disulfide and the like can be used. As a vulcanization acceleration auxiliary agent, zinc oxide may be also used. Zinc oxide forms a complex compound with fatty acid to improve the effect of accelerating vulcanization. As an antioxidant, for example, amines such as poly(2,2,4-trimethyl-1,2-dihydroquinoline), phenyl-α-naphthylamine and the like are used.

<Tire Reinforcement Belt>

The tire reinforcement belt of the present invention is formed by coating steel cords with the aforementioned rubber composition for coating a steel cord. More specifically, a tire reinforcement belt is formed by coating a plurality of steel cords that are drawn and aligned in parallel, with a rubber composition for coating a steel cord containing diene-based rubber, a metal salt of an organic acid, a filler, and other additives such as sulfur.

A steel cord may be produced by combining steel wires twistingly. The twisting structure of a steel cord is not particularly limited.

A steel cord is preferably plated with brass, zinc, or an alloy thereof additionally containing nickel or cobalt, for the purpose of improving adhesiveness with rubber, and those preferably plated with brass are particularly preferred. By setting the content of Cu in the brass plating of the steel cord to 75% by mass or less, preferably 55 to 70% by mass, excellent and stable adhesiveness with rubber is obtained.

The tire reinforcement belt is used in the form of single sheet or a laminate of plural sheets, as a tire reinforcement material of a belt layer, reinforcement layer of a bead part, a side part reinforcing layer, or a carcass.

<Pneumatic Tire>

The pneumatic tire of the present invention has a belt layer formed of the tire reinforcement belt of the present invention. In the following, the pneumatic tire of the present invention will be explained with reference to FIG. 1. FIG. 1 shows an example of the pneumatic tire according to the present invention, and is a section view explanatorily showing a right half of the pneumatic tire.

A pneumatic tire T shown in FIG. 1 has a tread part 1, a belt layer 2, a side wall part 3 and a bead part 4, and further a jointless band 5 disposed outside of belt layer 2. Also provided are a carcass 7 whose ends are respectively folded around a pair of bead cores 10 and latched, and a bead apex 6 extending in the direction of sidewall part 3 from upper side of bead core 10. In bead part 4, a clinch rubber 8 is disposed in the region adjacent to a rim flange. Belt layer 2 is structured by laminating two tire reinforcement belts, and these tire reinforcement belts are disposed so that steel cords thereof cross each other in a tire circumferential direction.

Here, in FIG. 1, although two tire reinforcement belts are used as a belt layer, the present invention is not limited to this configuration, and two or more tire reinforcement belts may be used for forming the belt layer. It is to be noted that the pneumatic tire of the present invention may be used as a tire for various vehicles such as auto truck, bus, and heavy machinery, as well as a tire for use in a car.

In the following, the present invention will be explained in more detail with reference to Examples and Comparative examples, however, the present invention will not limited to these examples.

EXAMPLES

Examples 1 to 3 and Comparative Examples 1 to 2

(1) Preparation of Rubber Composition For Coating a Steel Cord

Components other than sulfur and a vulcanization accelerator in blending components shown in Table 1 were mixed and kneaded using a 1.7 L banbury mixer manufactured by Kobe Steel Ltd., and thereto, sulfur and the vulcanization accelerator were added and kneaded using a biaxial roller, to obtain an unvulcanized rubber composition. The blending amount of glass beads is variable, and the blending amount is shown in Table 2.

(2) Production of Tire Reinforcement Belt and Tire

After drawing and aligning steel cords (structure: four-stranded/one cord, composition of brass plating: 63% by mass of Cu) at a density of 35 cords/5 cm, these steel cords were coated with the rubber composition to form a tire reinforcement belt. Two belts were overlaid so that the steel cords cross each other in a tire circumferential direction (angle 22 degrees×−22 degrees) to form a belt layer, and then a tire was molded. Then, the formed tire was vulcanized at 170° C. for 10 minutes with a vulcanizer, to form a tire having the structure shown in FIG. 1 (size: 195/65R15).

Steering stability and rolling resistance of the produced tire were measured. Measuring methods of steering stability and rolling resistance of the tire are as follows.

<Steering Stability>

Using the above tire (195/65R15), in-vehicle running test was conducted on a test course of a dry asphalt road face, and steering stability performance at this time (rigid impression, lane change performance) was evaluated by the following 5 levels of feeling evaluations.

Evaluation 5: very good
Evaluation 4: good
Evaluation 3: normal
Evaluation 2: slightly inferior
Evaluation 1: poor Results based on the above evaluation method are shown in Table 2.

<Rolling Resistance>

The above tire was mounted on a regular rim (6JJ×15), and rolling resistance was measured at inner pressure of 230 kPa, at a speed of 80 km/h, under a load of 49N using a rolling resistance test machine available from STL. Relative values were calculated while the value of Comparative example 1 was regarded as 100. The larger the relative value, the smaller the rolling resistance, and the more excellent the performance is meant. Evaluation results are shown in Table 2.

TABLE 1

| Blending components | Parts by mass |
| --- | --- |
| Natural rubber[Note 1] | 100 |
| Carbon black[Note 2] | 65 |
| Glass beads[Note 3] | Variable |
| Process oil[Note 4] | 5 |
| Antioxidant[Note 5] | 2 |
| Stearic acid[Note 6] | 0.5 |
| Zinc white[Note 7] | 10 |
| Cobalt salt of organic acid[Note 8] | 1 |
| Sulfur[Note 9] | 5 |
| Vulcanization accelerator[Note 10] | 1 |

[Note 1] Natural rubber: TSR20 Grade
[Note 2] Carbon black: N326 (available from Mitsubishi Chemical Corporation)
[Note 3] Glass beads: T27-L017 (available from Toshin Riko, the particle diameter of a glass bead is 37 to 63 μm)
[Note 4] Process oil: Diana Process PS32 (available from Idemitsu Kosan Co., Ltd.)
[Note 5] Antioxidant: Sunflex 13 (available from Flexis)
[Note 6] Stearic acid: KIRI (available from NOF Corporation)
[Note 7] Zinc white: zinc oxide No. 1 (available from Mitsui Mining & Smelting Co., Ltd.)
[Note 8] Cobalt salt of organic acid: cobalt stearate, COST-F (available from Dainippon Ink)
[Note 9] Sulfur: Crystex HSOT20 (available from Flexis)
[Note 10] Vulcanization accelerator: Nocceler NS (available from Ouchi Shinko Chemical Industrial Co., Ltd.)

TABLE 2

|  | Comparative example 1 | Comparative example 2 | Example 1 | Example 2 | Example 3 |
| --- | --- | --- | --- | --- | --- |
| Glass beads (parts by mass) | 0 | 40 | 3 | 10 | 30 |
| Steering stability | 3 | 1.5 | 4 | 5 | 3.5 |
| Rolling resistance | 100 | 106 | 102 | 103 | 104 |

<Evaluation Result>

The evaluation results of Table 2 demonstrate that tires of Examples 1 to 3 in which 3 to 30 parts by mass of glass beads is blended, relative to 100 parts by mass of diene-based rubber realize better balance between steering stability and rolling resistance, compared to the tire of Comparative example 1 in which glass beads is not blended. The tire of Comparative example 2 in which 40 parts by mass of glass beads is blended has low steering stability, although it has excellent rolling resistance.

By applying a tire reinforcement belt in which the rubber composition for coating a steel cord of the present invention is used, to a pneumatic tire, steering stability and rolling resistance are improved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A pneumatic tire comprising a belt layer including at least two tire reinforcement belts formed by coating a plurality of steel cords, which are drawn and aligned substantially in parallel, with a rubber composition for coating a steel cord, the rubber composition comprising:

100 parts by mass of natural rubber;

0.5 to 5 parts by mass of a metal salt of an organic acid; and 30 to 100 parts by mass of a filler, wherein said filler contains 3 to 30 parts by mass of glass beads having a particle diameter of 37 to 63 μm, relative to 100 parts by mass of said natural rubber;

wherein said filler further contains 5 to 90 parts by mass of carbon black, relative to 100 parts by mass of said natural rubber; and wherein said plurality of steel cords are disposed so as to cross each other in a tire circumferential direction.

2. The pneumatic tire according to claim 1, wherein said metal salt of an organic acid is cobalt stearate or cobalt naphthenate.

* * * * *